US012718636B2

(12) United States Patent
Stevens

(10) Patent No.: US 12,718,636 B2
(45) Date of Patent: Aug. 25, 2026

(54) METHOD FOR COMMUNICATION BETWEEN A VEHICLE DIAGNOSTIC NETWORK AND A POWERTRAIN CONTROLLER

(71) Applicant: Hondata, Inc., Torrance, CA (US)

(72) Inventor: Derek Stevens, Redondo Beach, CA (US)

(73) Assignee: Hondata, Inc., Torrance, CA (US)

( * ) Notice: Subject to any disclaimer, the term of this patent is extended or adjusted under 35 U.S.C. 154(b) by 66 days.

(21) Appl. No.: 18/440,945

(22) Filed: Feb. 13, 2024

(65) Prior Publication Data

US 2025/0259486 A1 Aug. 14, 2025

(51) Int. Cl.
*G07C 5/08* (2006.01)
*H04L 12/40* (2006.01)

(52) U.S. Cl.
CPC ......... *G07C 5/0808* (2013.01); *G07C 5/0841* (2013.01); *H04L 12/40013* (2013.01); *H04L 2012/40273* (2013.01)

(58) Field of Classification Search
CPC .... H04L 12/40013; H04L 2012/40273; G07C 5/0808; G07C 5/0841
See application file for complete search history.

(56) References Cited

U.S. PATENT DOCUMENTS 8,786,858 B2 * 7/2014 Jouanique-Dubuis ........................ G01N 21/3504 356/437
10,599,537 B2 * 3/2020 Chae ................. H04L 12/40176
11,832,184 B2 * 11/2023 Cho ....................... H04L 12/413
11,841,354 B2 * 12/2023 Gerard ..................... G01M 3/26
2010/0140478 A1 * 6/2010 Wilson ............... G01N 21/3504 250/339.13
2014/0012947 A1 * 1/2014 Schaller ............... G07C 5/0808 709/217
2014/0036693 A1 * 2/2014 Mabuchi ................. H04L 43/10 370/243
2016/0098369 A1 * 4/2016 Berkobin ............ G06F 13/4068 710/106
2018/0293814 A1 * 10/2018 Gilbert ................ F02D 41/1406

* cited by examiner

*Primary Examiner* — Steven G Snyder
*Assistant Examiner* — Christopher A Daley
(74) *Attorney, Agent, or Firm* — Fulwider Patton LLP

(57) ABSTRACT

A method and system for avoiding conflicts across a vehicle diagnostics bus by incorporating a bridge device between the vehicle's data link connector and one or more sensors. The bridge device is capable of monitoring traffic across the vehicle's diagnostics bus, and conditions and transmits a sensor signal across the bus when said monitoring indicates that the transmission will not interfere or corrupt any other signals on said bus.

5 Claims, 3 Drawing Sheets

METHOD FOR COMMUNICATION BETWEEN A VEHICLE DIAGNOSTIC NETWORK AND A POWERTRAIN CONTROLLER

BACKGROUND

On-Board Diagnostics (OBD) systems in vehicles play a crucial role in monitoring the performance and health of the vehicle's major components. OBD systems are designed to detect and report malfunctions that could affect the vehicle's emissions, fuel economy, or overall performance. By continuously monitoring the various systems within the vehicle, OBD systems can identify issues such as engine misfires, emissions system malfunctions, or problems with the fuel delivery system. This information is then used to alert the user to potential issues and record problem codes that can be retrieved by diagnostic tools.

Devices communicate with a vehicle's OBD system through a standardized diagnostic port, usually located under the dashboard or within close proximity to the steering wheel. This port allows external devices, such as diagnostic scanners or telematics devices, to connect to the vehicle's OBD system and retrieve information about its performance and any error codes that have been stored. Once connected, these devices can communicate with the OBD system using standardized protocols such as OBD-II, which allows them to access real-time data and diagnostic trouble codes that provide valuable insights into the vehicle's health and performance.

When a user wishes to access the vehicle's OBD, connection occurs through the vehicle's data link connector ("DLC"). The Data Link Connector is a standardized 16-pin connector that is typically located under the dashboard of a vehicle. Devices may access the diagnostics bus as a SAE J1978-2 'scan tool', even if their function is not to act as a scan tool. Example devices would be a diagnostics tool, data logger, parameter display, driving monitor, vehicle tracker or powertrain programmer.

When a fixed device such as a vehicle tracker is employed, it is desirable that the DLC remains available. In this situation, an OBD2 "Y" cable or other splitter type connection may be employed to give more than one device access to the diagnostics bus. SAE J1979 is a standard developed by the Society of Automotive Engineers (SAE) that defines a standardized method for communicating with a vehicle's OBD system. This standard specifies the various parameters and data formats used to request diagnostic information from a vehicle's OBD system, as well as the format for the responses provided by the vehicle. SAE J1979 is commonly used in conjunction with the OBD-II (On-Board Diagnostics II) system, which is present in most vehicles manufactured since the mid-1990s. The standardization of OBD-II and the communication protocols defined in SAE J1979 are pivotal in enabling automotive technicians and diagnostic equipment to effectively interface with and retrieve diagnostic information from a wide range of vehicles. U.S. Pat. No. 9,246,288, the content of which is incorporated fully herein, describes integrated module that includes multiple inputs for communicating with a vehicle's OBD system.

As part of SAE J1979's protocol, a scan tool uses a fixed address of F1 hexadecimal. SAE J1979, however, only provides for one type of device, i.e., a scan tool to connect to the diagnostics network. Moreover, SAE J1979 lacks any address arbitration. Accordingly, when two or more devices are simultaneously connected to the diagnostics bus, each device has the same address, resulting in confusion and message conflicts. Device operation becomes inconsistent, especially at higher communicates rates.

CAN (Controller Area Network) packets are the fundamental units of data transmission in a CAN bus system. CAN is a robust and widely used serial communication protocol primarily designed for use in automotive and industrial applications. There are several types of CAN packets, including:

1. Data Frame: This type of frame is used for transmitting data from one node to another within the CAN network. It contains the data to be transmitted, as well as control information such as the identifier of the message and the data length code.
2. Remote Frame: A remote frame is used to request data from another node in the network. It contains an identifier that specifies which data is being requested.
3. Error Frame: Error frames are used to signal error conditions on the bus, such as a transmission error or an overload condition.

CAN packets are characterized by their efficiency, reliability, and real-time capabilities, making them well-suited for applications that require high-speed communication and robustness in noisy electrical environments. An individual CAN packet may only be 8 bytes long, however, so messages longer than 8 bytes must use multiple packets. ISO 15765 defines the way in which messages are broken into packets and the method used to send and receive these packets. If a situation arises where there is more than one device communicating on the diagnostics network as a scan tool, then even when the diagnostics bus has no packet traffic a message may be in the process of being transmitted or received. If a single CAN packet is sent during an ISO 15765 message, then that message will be disrupted and both sender and recipient receives an error code, causing each to independently deal with resulting the error. This situation disrupts the flow of information and compromises the data transfer process.

Powertrain programmers may use UDS to place the powertrain controller into a different diagnostics session where SAE J1979 parameters are not used, for example when reprogramming the internal memory of the powertrain controller. In this case messages from other scan tools on the diagnostic bus will disrupt the use of the powertrain controller and prevent the function of the device.

Powertrain programmers may use UDS message 'Communication Control' to switch off sending and receiving messages for all devices on the diagnostics bus. But if other devices are sharing the diagnostics bus, they will not stop communications when the USD message 'Communication Control' is sent as they do not expect a second scan tool to be present on the diagnostics bus.

SUMMARY OF THE INVENTION

To address the conflict of multiple devices accessing the OBD-2 of a vehicle, a "bridge" device is incorporated that acts as a gateway between two or more scan tools devices on a SAE J1979 CAN bus to allow simultaneous access to the bus from scan tools when the SAE J1979 specification only allows one scan tool device. This bridge device can be used, for example, to allow for a sensor to read the ethanol content of the fuel being consumed and pass this information to the vehicle's ECU while other sensors monitor different aspects of the vehicle's performance. To achieve this data traffic control, an adapter having an ethanol sensor in the fuel flow senses the ethanol level and generates a frequency based digital signal. This digital signal is processed by an electronic circuit to extract the fuel ethanol content and this data is communicated to the ECU over the diagnostics (CAN) bus. The data transfer is filtered by a security gateway to monitor and regulate the flow of data across the bus.

DETAILED DESCRIPTION OF THE PREFERRED EMBODIMENTS

The present invention is a method for using a bridge device that acts as a gateway between two or more diagnostic devices and a vehicle's engine control unit via the vehicle's data link connector (DLC). The bridge device incorporates a CAN filter to capture packets of data from the ECU to a dedicated scanning tool such as an ethanol sensor. The bridge device sets up a second filter for capturing data packets from the ethanol sensor to the ECU using the physical address and a third filter for capturing data packets from the ethanol sensor to the ECU using the functional address. Here, a physical address is unique identifier assigned to a powertrain controller. Conversely, a functional address is used to address all powertrain controllers on the network.

Figure 1:
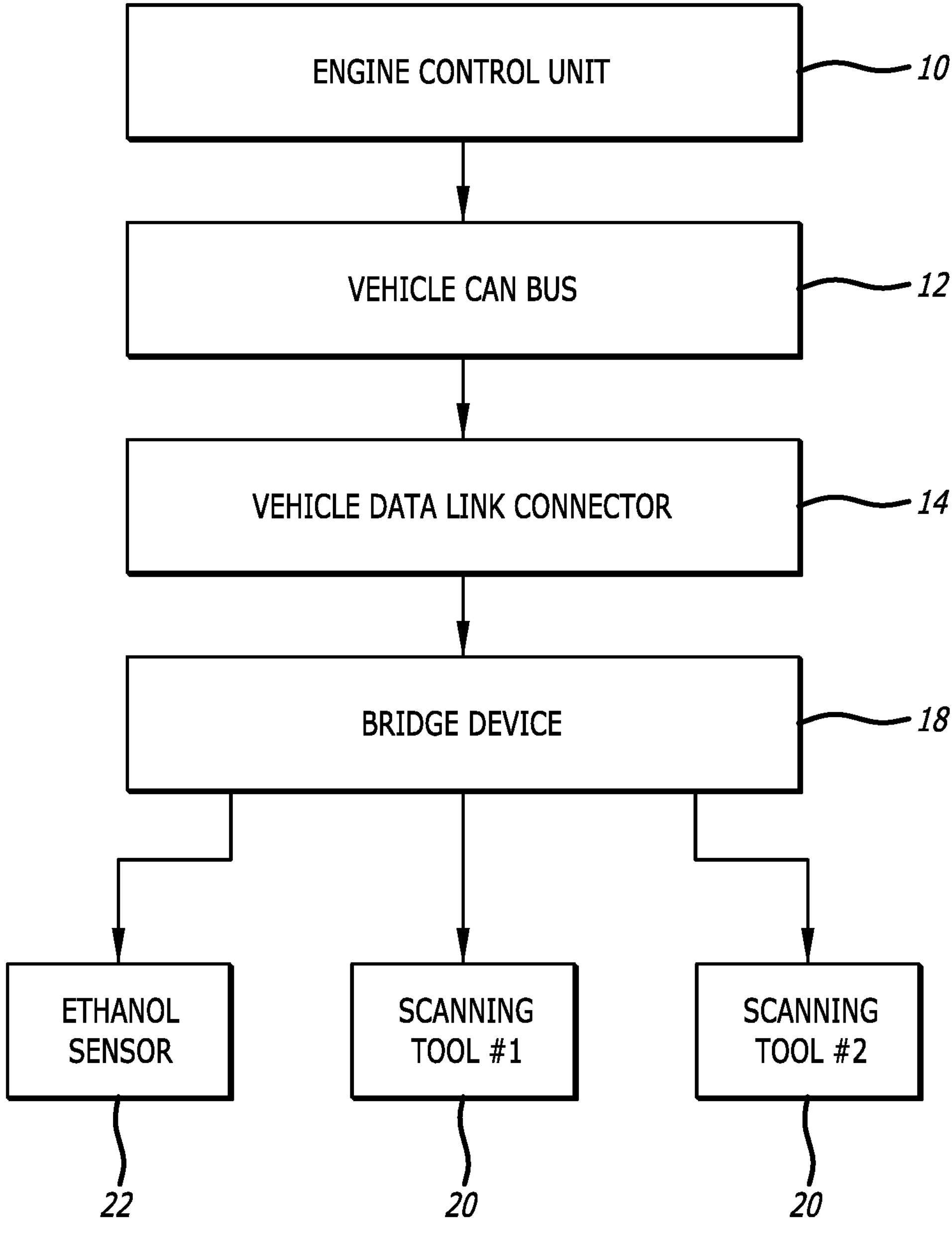
FIG. 1 is a schematic of data transfer between a scanning device, an ethanol sensor, and the engine control unit.

FIG. 1 is a flow diagram showing the communication of a bridge device with multiple diagnostic devices such as a scanning tool 20 and an ethanol sensor 22. The flow of data travels in both directions from each diagnostic device 20, 22 to the bridge device 18, to the vehicle's data link connector 14, and across the CAN bus 12 to the vehicle's ECU 10. The diagnostic device 20 may be a data logger, parameter display, driving monitor, vehicle tracker, powertrain programmer, or other diagnostic tool. In each case, these devices access the diagnostics bus 12 as an SAE J1978-2 'scan tool', even if their function is not to act as a scan tool.

Figure 2:
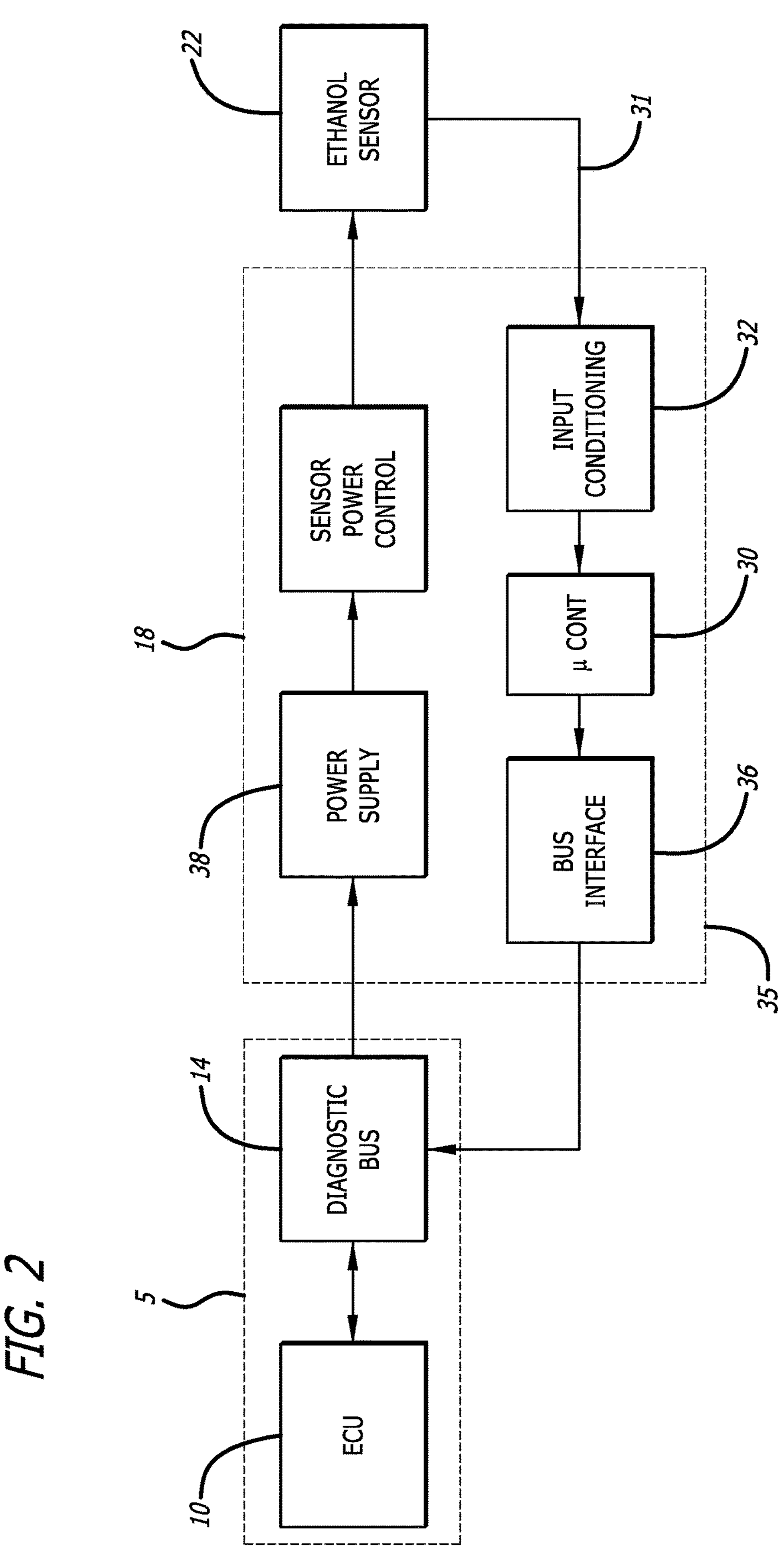
FIG. 2 a schematic of a bridge device of the present invention.

FIG. 2 is a schematic of the bridge device 18 used to connect the ethanol sensor 22 to the ECU 10 of a vehicle 5 through the data link connector 14. The bridge device has a housing 35, and within the housing is a motherboard having a microcontroller 30. The microcontroller is powered by power supply 38, which may draw power from the vehicle's electrical system. A power control unit 34 for the ethanol sensor 22 supplies power to the sensor so that it may supply the ECU with the fuel's ethanol content. The microcontroller 30 monitors the diagnostic bus 14 and delivers the ethanol reading from the sensor 22 when the traffic across the diagnostic bus make the transmission available. The signal 31 from the ethanol sensor 22 is first passed through a filter 32 that screens the signal and conditions the signal for transmission across the CAN bus to the ECU 14. This conditioned signal 33 is communicated by the microcontroller 30 to a bus interface 36, which acts as a traffic controller to send the data to the ECU via the vehicle's CAN bus 12. The ECU 10 receives the signal from the ethanol sensor and evaluates the other engine conditions based on this information.

Figure 3:
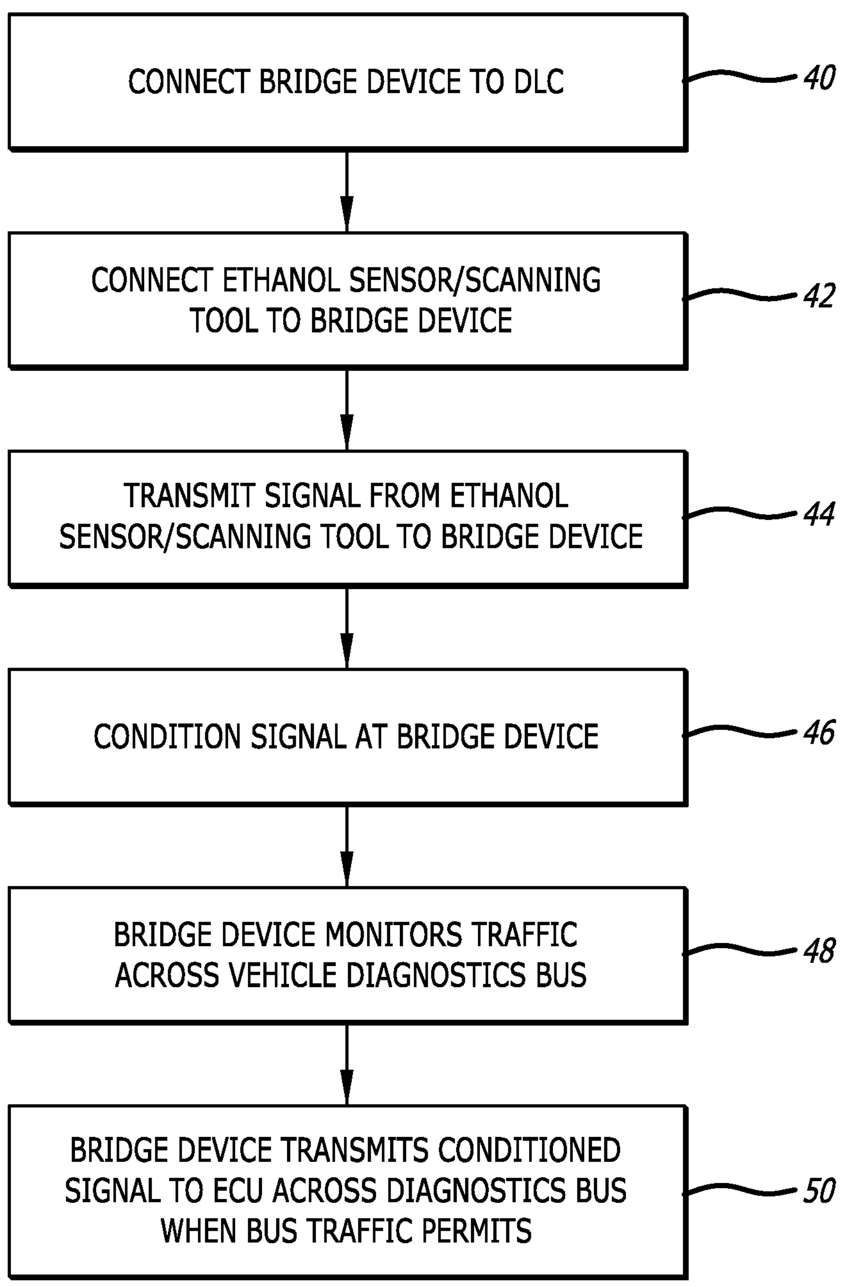
FIG. 3 is a flow chart of the operation of the data transfer.

FIG. 3 is a flow diagram of the method of the present invention. The bridge device 18 is initially installed on the vehicle 5 in step 40. Then a scanning tool such as an ethanol sensor 22 is connected to the bridge device 18 and inserted into the fuel line of the vehicle 5 in step 42. The ethanol sensor 22 broadcasts a signal 31 that is received by the bridge device 18 at an input conditioning filter 32 (step 44) to produce a conditioned signal in step 46. Here, the ethanol sensor has an open collector output, which allows the ethanol sensor to provide a ground path to the output with varying frequency and duty cycle. The input conditioning filter 32 provides a pull up voltage for the ethanol sensor output and also clamps the signal from the ethanol sensor in order to prevent damage to the microcontroller 30 due to excessive voltage. The microcontroller 30 within the bridge device 18 utilizes a CAN bus interface module 36 to monitor the traffic across the vehicle's diagnostics bus 14 at step 48, and transmits to the vehicle's engine control unit 10 the conditioned signal when the microcontroller determines that the bus permits an uninterrupted and safe window to transmit the signal. The CAN bus interface module translates levels between the zero volt low end and the 3.3 volt high end of the microcontroller, and the 1.5 volt-3.5 volt CAN bus signaling voltages using a differential voltage technique. The CAN bus interface module 36 also handles physical bus error conditions like shorts to ground and insulates the microcontroller from these conditions. The operation of the CAN bus interface module allows the bridge device 18 to supply the ECU 10 with an ethanol signal (or other scanning tool input) along with other inputs without disconnecting or disrupting the flow of information to the ECU.

It is understood that various scanning and/or diagnostics tools can be connected to the bridge device and used to supply data to the ECU during the vehicle's use, and the invention is not limited to a particular scanning tool. Moreover, the foregoing description is intended to be an example of the method for which the invention operates. A person of ordinary skill in the art will recognize that various modifications and substitutions would be available and the invention is intended to include all such modifications and substitutions. In the absence of any expressed exclusion of more broader aspects of the invention, the scope of the invention is properly measured by the following claims using their plain and ordinary meanings consistent with, but not limited by, the foregoing descriptions and depictions.

I claim:

1. A method for exchanging data between a plurality of scanning devices and an engine control unit of a vehicle that accesses data through a data link connector via a diagnostics bus, comprising:

providing an ethanol sensor in a fuel line of a vehicle;

placing a bridge device at the data link connector, the bridge device configured to receive data from multiple sensors including the ethanol sensor and another sensor;

powering the ethanol sensor using a power control unit on the bridge device;

obtaining an ethanol reading at the ethanol sensor and generating an ethanol signal;

filtering the ethanol signal from the ethanol sensor into data packets that are separate from data received from said other sensor;

monitoring traffic across the diagnostics bus via a Controller Area Network (CAN) bus interface module;

identifying a window in said traffic that allows for an uninterrupted transmission of the data packets;

transmitting said data packets to the engine control unit in said window without disconnecting or disrupting a flow of information to the engine control unit.

2. The method for exchanging data between a plurality of scanning devices of claim 1, wherein the bridge device is connected to a scanning tool in addition to the ethanol sensor.

3. The method for exchanging data between a plurality of scanning devices of claim 2, wherein the bridge device includes a microcontroller.

4. The method for exchanging data between a plurality of scanning devices of claim 3, wherein the bridge device includes a power control for the ethanol sensor.

5. The method for exchanging data between a plurality of scanning devices of claim 1, wherein the bridge device includes a data bus interface for monitoring traffic across the diagnostics bus.

* * * * *